United States Patent
Kilzer

(10) Patent No.: US 9,813,479 B2
(45) Date of Patent: Nov. 7, 2017

(54) BROWSER WITH VIDEO DISPLAY HISTORY

(71) Applicant: Apple Inc., Cupertino, CA (US)

(72) Inventor: David Kilzer, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 204 days.

(21) Appl. No.: 14/551,959

(22) Filed: Nov. 24, 2014

(65) Prior Publication Data

US 2015/0356195 A1 Dec. 10, 2015

Related U.S. Application Data

(60) Provisional application No. 62/008,436, filed on Jun. 5, 2014.

(51) Int. Cl.
| | |
|---|---|
| *G06F 17/22* | (2006.01) |
| *H04L 29/08* | (2006.01) |
| *H04N 5/85* | (2006.01) |
| *H04N 21/482* | (2011.01) |
| *G06F 17/30* | (2006.01) |

(52) U.S. Cl.
CPC .......... *H04L 67/02* (2013.01); *G06F 17/2247* (2013.01); *G06F 17/30846* (2013.01); *H04N 5/85* (2013.01); *H04N 21/4828* (2013.01)

(58) Field of Classification Search
CPC .......... G06F 17/30846; G06F 17/2247; H04L 67/02; H04N 21/4828; H04N 5/85
See application file for complete search history.

(56) References Cited

U.S. PATENT DOCUMENTS

| 7,055,100 | B2* | 5/2006 | Moriwake | G11B 27/034 |
| | | | | 348/E5.051 |
| 7,581,186 | B2 | 8/2009 | Dowdy et al. | |
| 7,769,819 | B2* | 8/2010 | Lerman | G06F 17/30017 |
| | | | | 709/203 |
| 7,809,802 | B2* | 10/2010 | Lerman | G11B 27/034 |
| | | | | 709/203 |
| 8,156,176 | B2* | 4/2012 | Lerman | G11B 27/034 |
| | | | | 348/513 |
| 8,201,096 | B2 | 6/2012 | Robert et al. | |
| 8,555,177 | B1* | 10/2013 | Junee | H04L 65/403 |
| | | | | 715/719 |
| 8,745,684 | B1* | 6/2014 | Ong | H04N 21/23109 |
| | | | | 707/723 |
| 9,055,343 | B1* | 6/2015 | Lewis | H04N 21/4826 |

(Continued)

*Primary Examiner* — Maikhanh Nguyen
(74) *Attorney, Agent, or Firm* — Ronald Fernando

(57) ABSTRACT

A web browser is configured to provide a video history display of videos that have been displayed in the browser, while excluding from the video history display representations of non-video pages. The browser stores information identifying videos embedded in web pages, including the source network location of the video, and video title, playback time, and representative image of the video (and optionally other attributes). The representative image of the video is derived from a frame of the video, and excludes other content from the web page in which the video was embedded, such as text and graphics thereon. The video history display includes only representations of the embedded videos that were displayed in the browser, without including representations of non-video pages.

39 Claims, 7 Drawing Sheets

(56) References Cited

U.S. PATENT DOCUMENTS

| | | | | |
|---|---|---|---|---|
| 2002/0056095 A1* | 5/2002 | Uehara | ............ | G06F 17/30793 |
| | | | | 725/38 |
| 2002/0116716 A1* | 8/2002 | Sideman | ........... | G06F 17/30017 |
| | | | | 725/91 |
| 2004/0128317 A1* | 7/2004 | Sull | ................... | G06F 17/30849 |
| 2006/0080716 A1* | 4/2006 | Nishikawa | ........ | G06F 17/30849 |
| | | | | 725/89 |
| 2007/0183741 A1* | 8/2007 | Lerman | ............ | G06F 17/30017 |
| | | | | 386/249 |
| 2010/0088726 A1* | 4/2010 | Curtis | ................. | G11B 27/034 |
| | | | | 725/45 |
| 2012/0011468 A1* | 1/2012 | Zhang | ............... | H04N 21/4431 |
| | | | | 715/788 |
| 2014/0186008 A1* | 7/2014 | Eyer | ....................... | H04N 5/76 |
| | | | | 386/240 |

* cited by examiner

BROWSER WITH VIDEO DISPLAY HISTORY

CROSS-REFERENCE TO RELATED APPLICATION

This application claims the benefit of U.S. Provisional Application No. 62/008,436 filed on Jun. 5, 2014, which is incorporated by reference in its entirety.

TECHNICAL FIELD

The disclosed embodiments relate to a browser configured to provide information about the user's history of viewing videos on web pages using a browser.

BACKGROUND

Recent studies have shown that at least one-half of Internet traffic is users watching videos on video streaming sites, with over four billion of hours of videos being viewed in just the first quarter of 2013. Most users view videos in a web browser application, such as Apple Inc.'s SAFARI™ web browser, or similar web browser applications from other providers. Existing web browsers are designed to access all types of web pages, and are not restricted to just viewing pages with videos embedded or linked therein. Existing web browsers typically provide a history display that shows or lists the web pages that the user has recently visited. The display includes typically all of the web pages the user visited, including both pages providing access to a video that the user viewed ("video pages") in the browser, as well as other web pages from blogs, news sites, commerce sites, and so forth that may have no video on the pages at all, but just text and/or graphics. Thus, if the user is looking for a specific recently watched video, the user must sift through all of the recently visited pages in the history display to locate that specific video page, and then from there reload the video page into the browser in order to view the video again. This is time consuming for the user, and does not provide a mechanism for readily browsing only video pages and accessing previously viewed videos.

Second, in the conventional history display, each web page is represented by a small scale rendering of the visible web page content (e.g., a "thumbnail") so that user sees the context of the entire web page as a reminder of its content. This is the case for both video pages and non-video pages: other content on a video page, such as text, banners, sidebars, advertisements, links to other videos, graphics, and like are shown in reduced form as well. Given the limited size of a thumbnail, the portion of that image that is of the video itself, may be very small, perhaps only dozens of pixels in height and width. As a result, when the user is reviewing a conventional history display to find video pages, the salient information about the prior viewing experience—the video itself—is buried in the context of irrelevant information.

SUMMARY

A web browser, capable of accessing all types of web pages including video pages and non-video pages, is configured to provide a video history display consisting essentially of previously played media files, such as videos. The video history display is configured to include representations of only videos that have been played back in the browser, and exclude representations of web pages that do not contain videos. In this manner, the user can readily browse through the video history display for previously played videos, without wasting time sifting through representations of non-video pages.

Further, in one embodiment, each video representation is based on a representative image of the video, and excludes other content that may be included the web page in which the video was included, such as surrounding text, graphics, banners, sidebars, and the like. In this manner the most salient information to the user—an image of the video that was played—is presented without any irrelevant content information from the embedding page. This is beneficial because the user is more likely to remember a previously played video from a frame contained therein, than from the content of the embedding web page, which the user may not have noticed or paid any attention to at all.

In one aspect, a web browser configures a video history display by storing information identifying web pages that the user has accessed in the web browser, including both video pages, and non-video pages. For video pages from which the user played a video, the browser stores additional metadata identifying the source URL (or other form of network address) for the video the user played (which may be different than the URL of the embedding web page) as well as descriptive metadata associated with the video, such as the title of the video and a date/time of the playback, the duration of the playback, and a reference to a representative image of the video. In response to the user accessing a video history display function in the browser, the browser processes the stored information for the visited web pages, and identifies therein video pages that include videos, along with the metadata identifying the URL, the descriptive metadata, duration of view, and the representative image of each such video. If a user played a video several times, the browser selects only the most recently played instance from the stored information. The browser then generates the video history display, using for each video the representative image to form the video representation. The video representations are sorted, preferably in reverse chronological order (most recent first), and displayed, each the title of the video; the source URL of each video is optionally displayed. The user can then browse through the display (or search based on keywords that match to the title or other metadata), viewing the video representations in the sorted order. In one embodiment, upon selection of a video representation, the browser uses the associated source URL for the video to retrieve the video from its network location directly, allowing the user to begin playing back the video immediately within the video history display itself, rather than merely opening the video page itself on which the video is included.

The features and advantages described in this summary and the following detailed description are not all-inclusive. Many additional features and advantages will be apparent to one of ordinary skill in the art in view of the drawings, specification, and claims hereof.

The figures depict various, non-limiting embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

System Environment

Figure 1:
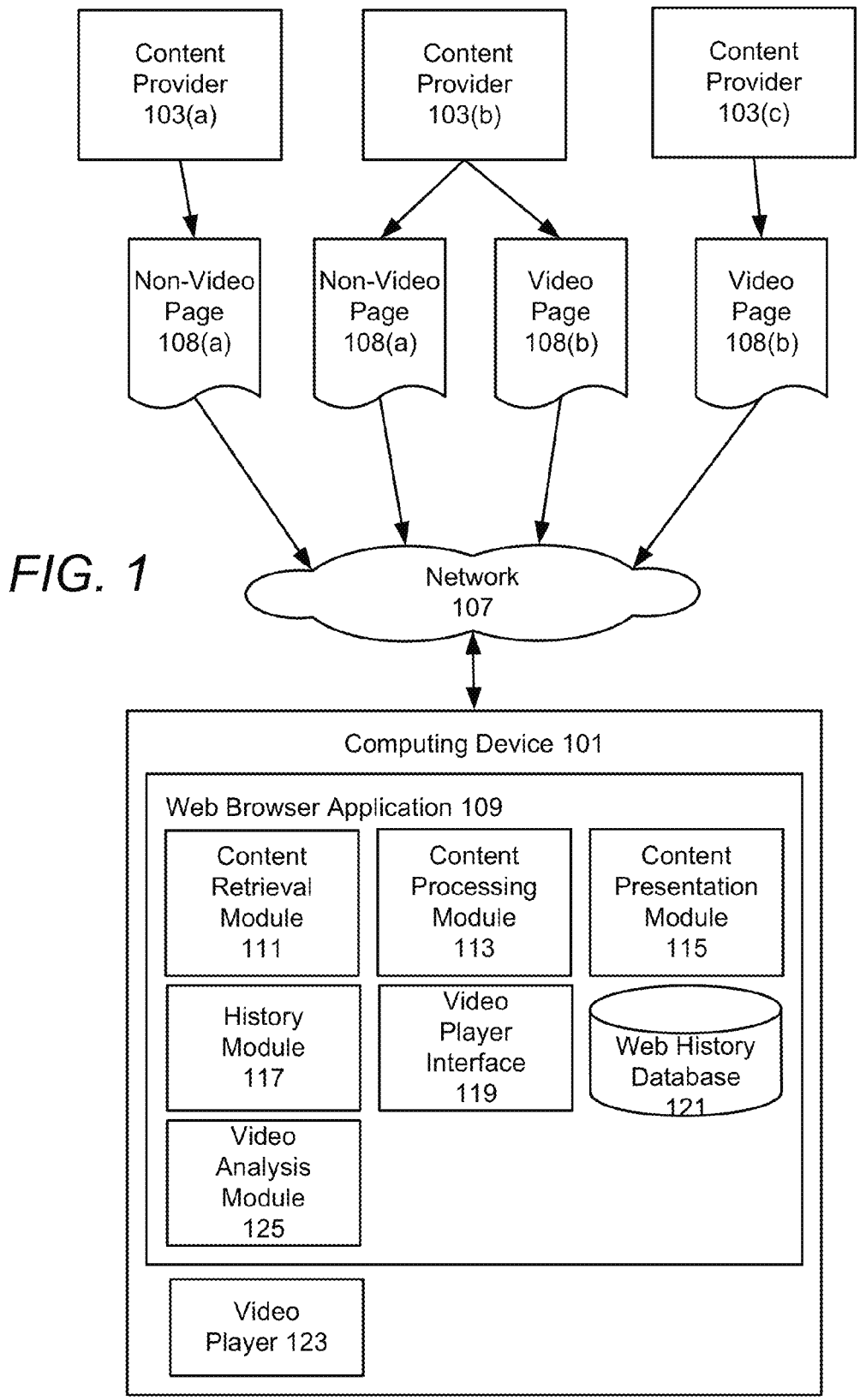
FIG. 1 shows a diagram of a system environment of a system environment including a web browser configured according to one embodiment.

FIG. 1 is a high-level block diagram of a computing environment for a web browser application configured to generate a video history display according to one embodiment. The environment includes a computing device 101 communicatively coupled to multiple content providers 103, via a network 107. The network 107 may comprise any combination of local area and/or wide area networks, using both wired and wireless communication systems.

Content provider 103 can be classified into three types. Non-video content providers 103(a) provide only non-video web pages 108(a) comprising text, graphics, audio, data, and which do not contain an embedded video; such pages and may be of any type such as commerce sites, government sites, blogs, forums, and the like. General content providers 103(b) provide both non-video web pages 108(a), and video pages 108(b). Examples of general content providers 103(b) include news sites and social networks. A video page 108(b) is a web page that contains an embedded video. For the purposes of this disclosure, a video may be embedded in video page 108(b) in a number of different ways, including tags or hyperlinks, as further described below. Finally, a third type of content provider 103(c) provides predominately video pages 108(b) (though it may serve non-video pages as well). Examples of this type of content provider 103(c) include video hosting and sharing sites such as YouTube™, Vimeo™, as well as video distribution sites such as Hulu™, Amazon™, and NetFlix™. Although only a single instance of each type of content provider 103 is shown in FIG. 1, it is understood that the computing device 101 can access and receive non-video pages 108(a) and video pages 108(b) any number instances of the different content providers 103. The term "web page 108" herein refers to both non-video pages 108(a) and video-pages 108(b).

In one embodiment, the computing device 101 is an electronic device such as a desktop computer (e.g., an iMac™), a laptop computer (e.g., MacBook™), a tablet computer (e.g., iPad™), a mobile phone (e.g., iPhone™), a media device (e.g., iPod™), etc. Generally, the computing device 101 enables a user to view web pages 108 provided by any content provider 103.

The computing device 101 includes a web browser application 109 configured to provide a video history display, and can be characterized by having certain multiple modules to accomplish this function. These modules include a content retrieval module 111, a content processing module 113, a content presentation module 115, a history module 117, video player interface 119, and web history database 121. Optionally, the web browser 109 includes a video analysis module 125. As is known in the art, the term "module" refers to computer program logic that configures the computing device 101 to provide specific and particular functionality upon execution by the computing device 101, thereby configuring the computing device 101 as a particular computing device. Other embodiments of the web browser application 109 and/or computing device 101 can have different and/or other modules than the ones described here, and the functionalities of the modules as further described below can be distributed among the modules in a different manner. In addition, modules providing functionality not material to the operations described herein are not shown or described, to avoid obscuring the relevant details of the embodiments. Generally, the web browser application 109 can be implemented in any number of languages and platforms. One suitable development platform is the WebKit open source browser engine, available at www.webkit.org; other development environments include Microsoft Web Platform using Microsoft ASP.NET Framework, and Google Web Toolkit.

In one embodiment, the content retrieval module 111 is to configured to retrieve web pages 108, including both non-video pages 108(a) and video pages 108(b) from the various types of content providers 103, and is one means for performing this function. The content retrieval module 111 is responsible for loading a given web page (identified by URL or other network identifier), including all necessary resources, such as text objects, graphics, scripts, etc., from the network and content provider 103 of the web page. Generally, the content retrieval module 111 performs both page loading and resource loading. Page loading includes initiating creation of page (or document) object for containing the page content, managing networks requests for the page contents, and managing the lifecycle of the loaded page. Resource loading includes checking whether specific page elements, such as HTML, scripts, images, and other content, are available in a local cache, and if not loading the elements from their identified network locations.

The content processing module 113 is configured to process the loaded page content into a local data structures, such as a document object model (DOM) and a rendering tree, that can be used by the content presentation module 117 for displaying the web page as well, and is one means for performing this function. Generally, the content processing module 113 creates the DOM which represents the HTML of the web page in a node tree, comprising a root document node, element nodes for HTML or XML tags, and text nodes for raw text that occurs between other elements. The content processing module 113 further creates the rendering tree used to render web pages. The rendering tree represents a topological or structural relationship among web page elements represented as nodes in the rendering tree corresponding to the nodes of the DOM as well as additional objects. Each node of the rendering tree represents an element of the web page. An web page element may include document content and/or layout specifications, such as size attributes associated with a markup language tag (e.g., HTML tags) for presenting the document content. The content processing module 113 creates the rendering tree by processing the display properties (e.g., style sheet properties such as location, width and height, margins, padding, borders, font, etc., as well as block and inline attributes) of the page elements to determine the appropriate rendering function and output.

In accordance with one embodiment, the content processing module 113 is configured to parse each web page 108 and identify embedded video objects contained therein, along with their associated attributes, the network source URL from which the video is sourced (which is typically different than the URL of the video page 108(b) itself), as well as attributes such as the video format type, the height and width of the video, the duration of the video, the title of the video, the parent window of the video, and so forth. This information is stored to appropriate DOM elements.

An embedded video can be identified in a number of different ways, depending on the language in which the web page is encoded. For example, HTML5 includes a <video> element that identifies a video including attributes identifying the source URL, its type, as well as its height and width, and duration. For example, <video width="320" height="240" controls autoplay><source src="movie.mp4" type="video/mp4"></video>embeds the movie file "movie.mp4" into a web page.

Where the web page does not use the <video> element, such as page coded in HTML 4, an embedded video can be identified by the <embed> element, where the source attribute of embedded object specifies a URL to a file having a video file type based on its file extension, such as .mpeg (MPEG-4), .mov (QuickTime), .flv (Flash), .wmv (Windows Media Video), or .webm (WebM). For example, the content processing module 113 can identify an embedded video file by identifying an embed element, and checking the file extension of the file identified by the source attribute. For example, <embed src="video.swf" height="200" width="200">, embeds a Flash video file "video.swf" into a page with a player window of 200×200 pixels. Similarly, the <object> tag can be used to embed a video. For example, <object height="200" width="200" data="video.swf"></object> similarly embeds the video file.

Similarly, an embedded video can be identified by the use of the <object> tag, where the data attribute specifies a source URL to a file having a video file type based on its file extension as above. Finally, video can be embedded in web page using a hyperlink to its source. For example, <a href="video.swf"> Play a video file</a> can be used to embed a video. These are only a few ways of embedding videos in web pages (which can be used individually and in combination), and it is expected that as web languages develop, additional techniques will be developed.

The title of a video can also be identified in various ways, again depending on the language of the web page. Pages in HTML 5 support the use of the title attribute for any type of element. Accordingly, where a title attribute is included in the <video> element, the content processing module 113 uses that information. Where a title attribute it not available (e.g., in HTML 4 or earlier), content processing module 113 can identify a title based on the text proximate the embedded video, such as text that is positioned immediately above or below the video and centered with respect to the video, text placed in heading tags (e.g., <h1>, <h2>) or metadata elements (e.g., meta name="title" content="My Video") proximate the video, and the like. These and other heuristics can be employed.

Some web pages 108 include multiple different videos. For these pages, the content processing module 113 identifies each video therein, including its associated title and URL as a described above, and annotates the appropriate DOM elements.

Figure 2:
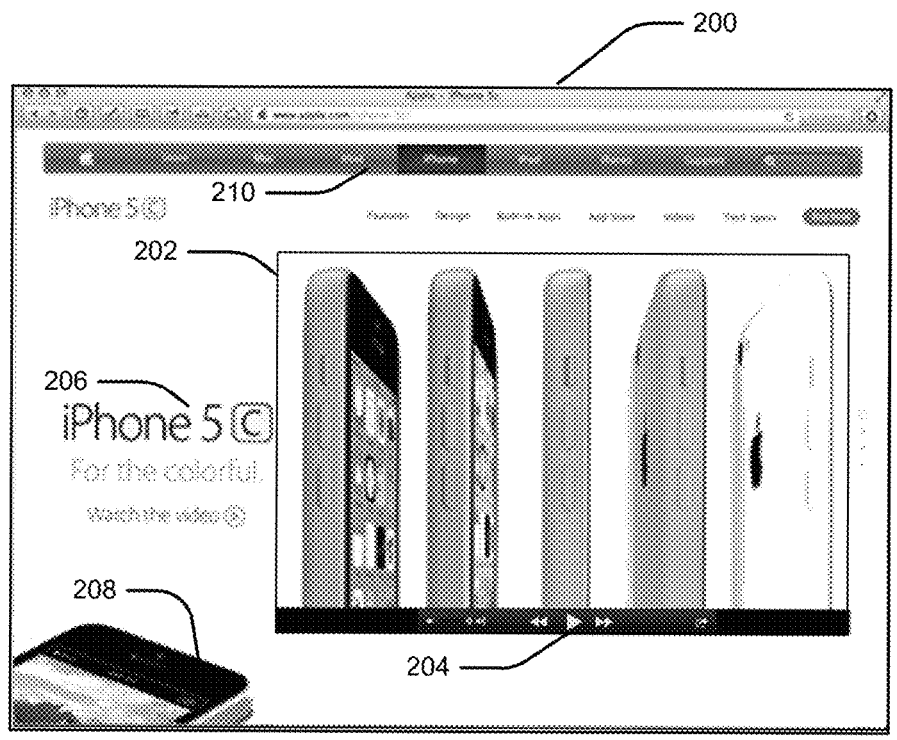
FIG. 2 shows an example of a video page including an embedded video.

The web browser application 109 includes a content presentation module 115. The content presentation module 115 is configured to render and display a web page on the computing device 101, and is one means for performing this function. In one embodiment, the content presentation module 115 renders an web page on the computing device 101 based on a rendering tree that represents the web page, displaying the rendered page in a main window of the web browser application 109. FIG. 2 illustrates a sample main window 200 in which a video page 108(b) is presented that contains an embedded video 202. Note that the video page 108(b) in FIG. 2 contains additional text 206, graphics 208, and menu bar 210, as is common on many video pages 108(b).

Figure 3:
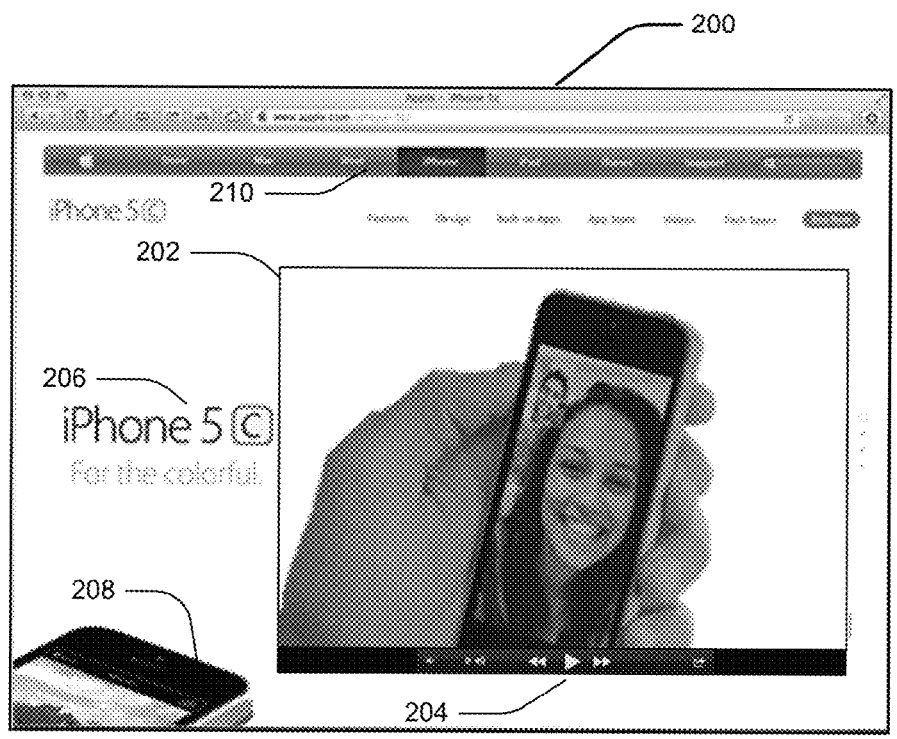
FIG. 3 shows an example of a video page, where the video has been paused during playback.

The web browser application 109 includes a video player interface 119 configured to provide video playback of videos, including both videos that are linked from web pages 108(a) as well as video embedded in video pages 108(b), and is one means for performing this function. Upon user selection of a play button or control (e.g. control 204), the video player interface 119 invokes an appropriate video player 123, such as Quicktime™, Windows Media Player™ Adobe Flash Player™, depending on the underlying video format (e.g., MPEG-4, MPEG-2, WMV, Flash, WebM, etc.) and the installed player(s) 123 available in the computing device 101. FIG. 3 illustrates the same video 202 on web page 200 as shown in FIG. 2 after some duration of playback on the page 200, having been paused at a particular frame midway through the video.

Referring again to FIG. 1, the web browser application 109 includes a history module 117 and web history database 121. The history module 117 is configured to maintain a history of all web pages 108 visited and/or played by the user, and store information and metadata pertaining to video pages 108(b) that contain embedded videos, and construct the video history display from such data, and is one means for performing this function.

Figure 4:
FIG. 4 shows one example of a video history display.

Referring now to FIG. 4, there is shown one example of the video history display 400, as may be constructed by the history module 117, using a cover flow type presentation. Methods of presentation using a cover flow are disclosed in U.S. Pat. No. 7,581,186, "Media manager with integrated browsers," and U.S. Pat. No. 8,201,096, "Browsing or searching user interfaces and other aspects," both of which are incorporated by reference here in their entirety. In this example, the video history display 400 has been activated by the user after viewing of several videos, including the illustrative video shown in FIGS. 2 and 3. The video history display 400 includes a number of video representations 402 from previously played videos. Thus, the video 202 that was paused in FIG. 3 is indicated by representation 402(b). Each representation 402 is based upon a representative image of the corresponding video, without any additional page elements (e.g., text, graphics) from the web page in which the video was embedded. Thus, representation 402 does not include any of the text 206, graphics 208, or menu bar 210 shown on web page 200 as in FIGS. 2 and 3. This allows the representation 402 to maximize the image size of the frame, thereby providing a better image to the user for recognizing the video. The user moves between representations 402 using cursor keys, a mouse, touchscreen or other input device, iteratively positioning each representation in the central position of representation 402(b).

Second, note that the image used in the representation 402(b) is derived from the frame that was shown in FIG. 3 at the time the video 202 was paused. This enables the user to very quickly recognize the video, and remember precisely the last portion of the video that they played. This is true of the other representations 402(a) and 402(c) as well. Below representation 402(b) is shown a control bar 404, so that the user can immediately start playback of the video by selecting the play button 408, which invokes the appropriate video player The title 406 of the video is shown below the representation 402(b), along with the source URL from which the video was accessed, and an indication of the date ("Today") when the video was last played. When another one of the representations 402(a), or 402(c) is moved to the center position, it is shown in conjunction with the control bar 404 as well, and its title 406 appears below it as well.

As described below, the time at which the video was paused is stored, and can be provided the underlying video player 123 (along with the source URL directly to the video file) to immediately start playback within the video history display 400, without having to reload the video page 200 itself. This is beneficial because the user can continue viewing the video directly within the context of the video history display 400 by selecting the play button 408 on the control bar 404, without having to open the video page 200 itself; should the user desire to view another video within the video history display, she can do so very quickly by stopping the playback, and selecting another representation such as representation 402(*a*) or 402(*c*), and playing it in the history display 400. By contrast, a similar result cannot be achieved in a conventional browser history display, since the user would have to open the web page containing the embedded video (thereby leaving the history display), start the video from that page, then reopen the history display (thereby leaving the web page), and traverse to a second video, select it for playing, and then open the second video's containing page, and start playback of the second video thereon—an obviously cumbersome and time consuming process involving opening and switching between multiple different windows. In addition, the second video would have a different position in the history display from the last time the user saw because of the change in viewing history, thereby making it harder for the user to locate the second video for viewing.

Figure 5:
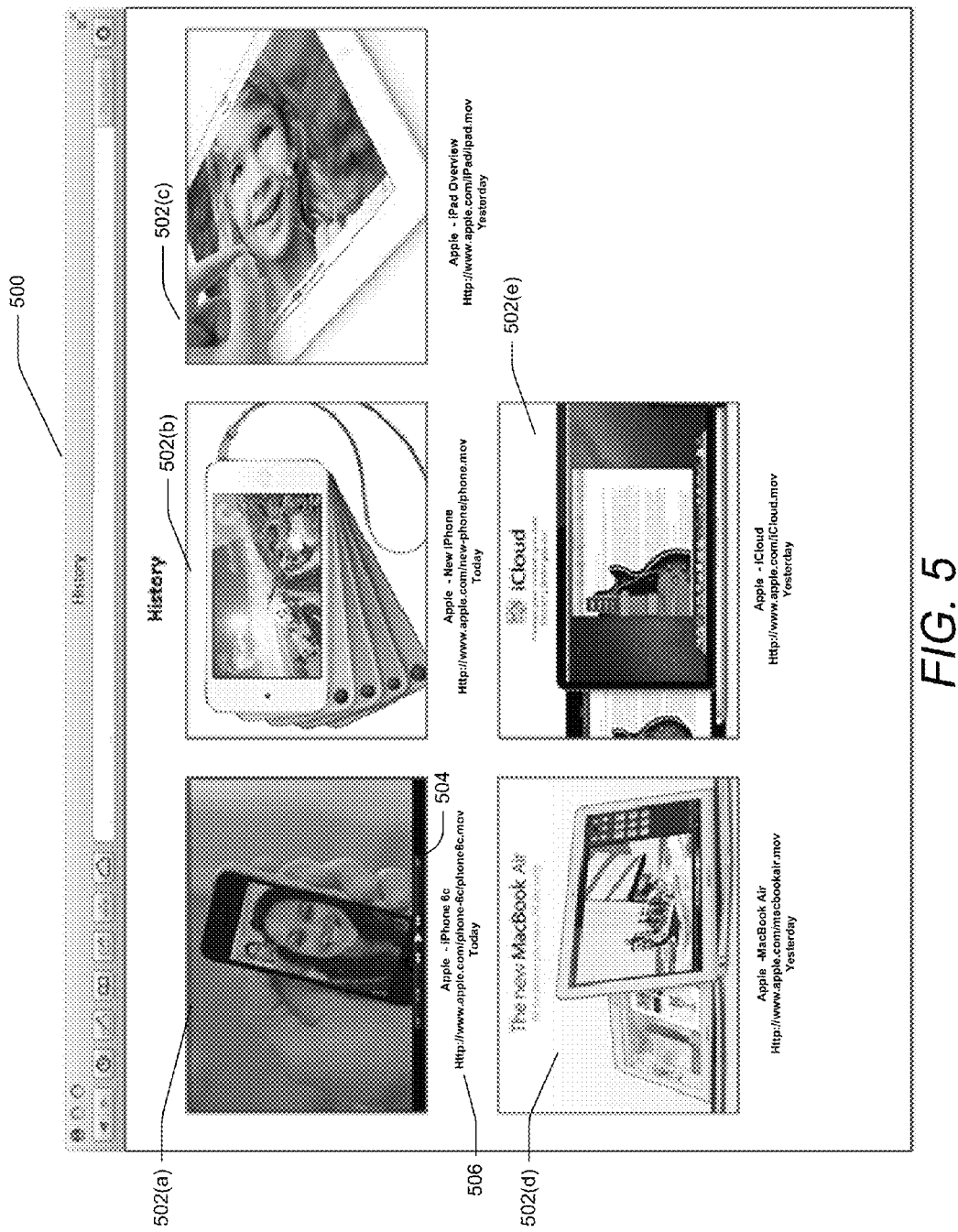
FIG. 5 shows another example of a video history display.

FIG. 5 illustrates another example presentation of the video history display 500, here using a simple grid layout. The user can move the focus between the representations 502 using cursor keys, a mouse, touchscreen or other input. Again, each representation 502 is shown with its corresponding title, video URL, and indication of the date of last view. In the example of FIG. 5, the first representation 502(*a*) is currently selected, and thus the control bar 504 appears with it. Again, the user can initiate and view playback of the video directly within the context of the video history display 500.

Referring again to FIG. 1, the web history database 121 is the repository in which the history module 117 stores the information for constructing the video history display 400. In one embodiment, based on the WebKit framework, the web history database 121 is implemented using the WebHistory class and WebHistoryItem. In this embodiment, each web page 108 is represented by a WebHistoryItem, which stores the information about the page that has been accessed, and a WebHistory class maintains an ordered collection of the WebHistoryItems, including maintaining information as to the date/time on which each web page 108 was visited. The WebHistoryItem generally includes the URL of the web page 108, and the title of the web page, and the calendar date on which the web page 108 was last accessed. (In Microsoft's ASP.Net Framework, browser history is maintained in a browser history stack by a ScriptManager; any of the implementations described herein can be readily adapted to the ASP.Net Framework.) The history module 117 is responsible for creating, adding, removing web history items from the web history database 121, as well as processing the history items in the database 121 to determine which ones are for video pages 108(*b*) for use in constructing a video history display.

In accordance with the various embodiments, the history module 117 associates additional metadata related to embedded videos to the history items of video pages in the web history database 121. One embodiment for storing the additional metadata in association with the web history item uses a separate video history table in the web history database 121. Table 1 illustrates one example table structure for a video history table, and hypothetical data:

TABLE 1

Video history table

| Web Page URL | Video Source URL | Date Played | Video Title | Playback Time | Representative Image URL |
|---|---|---|---|---|---|
| /url_1 | /url_1/vid_A.mov | Oct. 1, 2013 | "My Video" | 00:03:00 | /local/. . ./imageA.jpg |
| /url_2 | /url_2/vid_X.mpeg | Sep. 29, 2013 | "Product X" | 00:01:15 | /local/. . ./imageX.jpg |
| /url_2 | /host_A/vid_Y.mpeg | Sep. 28, 2013 | "Product Y" | 00:00:08 | /local/. . ./imageY.jpg |
| /url_3 | /host_B/vid_R.mov | Sep. 27, 2013 | "New Video" | 00:00:00 | /local/. . ./imageR.jpg |

The video history table in this example uses the web page URL of the web page embedding a video as a primary key for accessing the table. Each table entry thus comprises the web page URL (or equivalent hash thereof), the video source URL, the date last played, the title of the video, the amount of playback time, and reference to the representative image (e.g., URL, pointer, etc.). Additional fields of data may be included as well, such as attributes of the video (e.g., size, aspect ratio, parent window, player ID, and the like).

In the example data of Table 1, there are two web pages, at url_1 and url_2, with a single video at url_1 that was played, with the source video URL of /url_1/vidA.mov, the date it was played, its title "My Video" (which again is generally different from the title of the web page itself), along with the amount of playback time (3 minutes), and the URL of the representative image stored locally. For the web page at url_2, there are two videos that were played on that page, having different video source URLs, /url_2/vid_X.mpeg (which is within the same domain as the embedding web page itself) and /host_A/vid_Y.mpeg, which is a network location in of a content provider in different domain as the embedding web page. The first of these videos was played for 1 minute, 15 seconds, while the latter one was played for only seconds. The last entry is a video embedded in the web page at url_3, but also provided from a different domain at the source URL of /host_B/vid_R.mov. Note that the playback time for the last entry is 00:00:00 which indicates here that the video has been played once in its entirety, and the playback time has been reset accordingly; alternatively, a separate attribute may be stored in the video history table indicating whether the video has been played back in its entirety.

Accordingly, when the user accesses a given web page that contains a video, the history module 117 can detect whether the video has been played, e.g. by listening for an event starting playback. In response to detecting playback of the video, the history module 117 creates an entry in the video history table for each video on the page that was played, stores the web page URL in the table, and adds the video source URL to the entry. When the video playback is stopped (or when the user leaves the page), the history module 117 updates the playback time. If the video has been played back in its entirety, the playback time is reset to 00:00:00. In addition, when inserting a new entry into the table, the history module 117 can check to see if there is an existing entry with a video having a matching web page URL and video source URL. If so, the existing entry can be updated with the date that the video was last played and playback time. The history module 117 also can perform garbage collection on the video history table by periodically removing entries that are over a certain age. When constructing the video history display, the history module 117 can query the video history table to identify directly the web pages that have an embedded video. Thus, this embodiment also allows for multiple videos to be associated with a given web page, and allows for direct playback of a video from within the context of the web history display. Another benefit is that this implementation can be readily used with existing browsers (including both WebKit and non-Webkit types) without modification to the existing structures use for storing web history items themselves.

Second, the history module 117 associates a representative image for the video to the history item for the web page, for use in constructing the representation 402 of the video. The representative image can be identified in the video history table by a URL as well as a reference pointer to a local memory location accessible to the browser. The representative image is derived from a selected frame from the video, and can be obtained in various ways. In some cases for video pages 108(*b*) coded in HTML 5 with the <video> tag, a poster attribute specifies the URL for a representative image. If no poster attribute is available, the history module 117 can extract a selected frame from a portion of the video that has been played back, and store this as an image file attached to the history item for the video.

In one embodiment, the frame selected depends on whether the video has been completely played back. If the video has been completely played back, then the selected frame is taken from an initial portion (e.g., first 0-5 seconds) of the video, and the playback time is reset to correspond to the time of the frame or the beginning of the video at 00:00:00. This is beneficial because the user may better remember the entire video by an early frame and when seeing the representative image at in the video history display can start playing the video from the beginning. If the video has not been completely played back, then the frame selected is from a last portion of the video displayed (e.g., last 3-5 seconds) when the user paused the video or left the page prior the video being played completely, such as the last frame displayed or a frame closely proceeding the last frame, e.g., within the preceding 2 seconds or thereabouts, and the playback time is set to the time of this selected frame. This is beneficial because the selected frame is likely to be one of last frame actually viewed by the user, and thus when seen again later by the user as the representation in the video history display, will likely best trigger their recognition of the video as one they previously watched, and allow the user to restart playback from thereabout, without having to start playback from the beginning of the video.

A selected frame can be extracted from a video in a number ways, for example by calling a function of the video player 123, or drawing the frame to hidden canvas and storing the canvas as an image file. The representative image can derived from the selected frame, including using the entire frame as stored, or by additional image processing steps, such as cropping, subsampling, color/brightness/contrast adjustment and the like, as well as testing to make sure that the selected frame is suitable for display (e.g., the frame is not blank).

In another embodiment, the representative image is created by the video analysis module 125. The video analysis module 125 is configured to select key frames, periodic frames, or frames of significant content from a video, and use such a frame to derive the representative image. In one implementation of the video analysis module 125, the module 125 captures a frame every N seconds (e.g., every 10 seconds). Once the video playback is stopped (or the user leaves the page), the video analysis module 125 determines whether the last captured frame it is suitable for use as a representative image by evaluating whether it satisfies one or more selection criteria based on the image content features (e.g., color, motion, edges, textures, gradients, wavelets, luminance, etc.). The selection criteria may include that the frame is not a blank frame (e.g., all or mostly black, or all or mostly white using a frame color histogram), that the frame has less than a threshold amount of motion (by determining an average motion vector in the relative to a prior and/or subsequent frame, or a motion vector distribution), that the frame is not blurry (using blur detection methods), or other image content dependent features. If the last captured frame meets the selection criteria, it is selected. If the last captured frame does not meet the selection criteria, the video analysis module 125 can iteratively process previously captured frames until a suitable one is found. The module 125 can then derive the representative image from the selected frame, as described above, and pass the representative image to the history module 117.

Third, the browser application 109 monitors the state of an embedded video in response to the user playing the video, pausing the video, and of course leaving the video web page itself. When the video is paused or the user leaves the page, the browser application 109 determines the playback time of the video (e.g., reading a currentTime attribute in HTML5). Accordingly, in one embodiment, history module 117 stores the playback time the video in the video history table, as illustrated in Table 1 above. This information is then used when constructing the video history display to select only those videos that have been played for a minimum amount of time, such as 10 seconds.

The above described embodiment using a video history table is one way of storing the additional metadata for a video in association with the web history item. Another way of storing the additional metadata in association with a web history item is by extending the WebHistoryItem class (or corresponding class or data structure in other platforms) to include the items of metadata as further attributes of a web history object. Thus, the video source URL, video title, playback time, and representative image can be accessed as object attributes directly, without using a table query.

Figure 6:
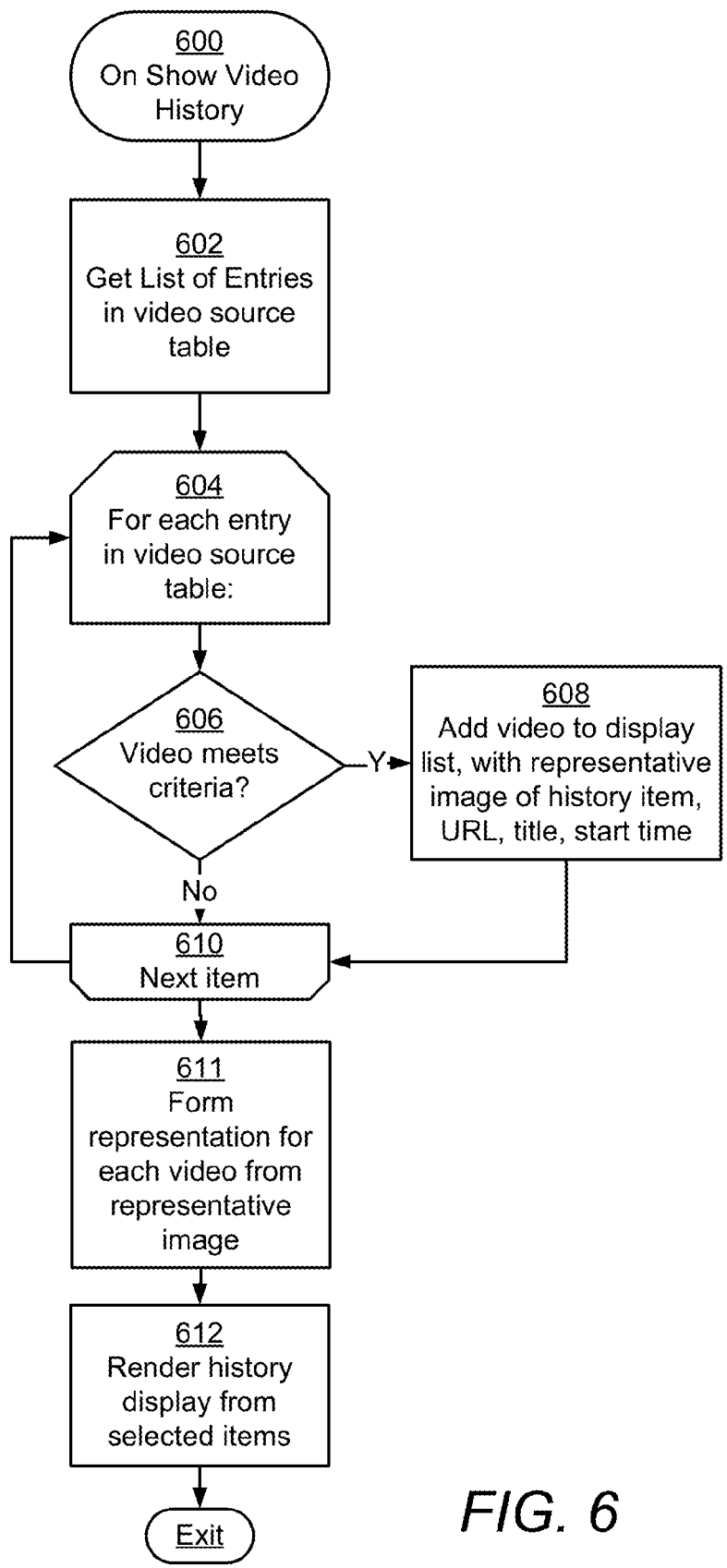
FIG. 6 is a flow diagram of one embodiment of a method in a browser for generating a video history display.

Referring now to FIG. 6, there is illustrated a flow diagram of the operation of the history module 117 for constructing the video history display, using a video history table, according to one embodiment; as can be appreciated numerous of implementations can be devised as well using other browser development platforms.

The flow is initiated 600 upon the user activating a show video history function, such as by a keyboard input or menu item selection. The history module 117 accesses the video history table in the web history database 121 to get 602 a list entries in the video history table. Starting from the most entry (typically the first table entry, where the table is maintained in reverse chronological order) and proceeding 604 to the least recent entry, history module 117 determines 606 whether the entry meets one or more selection criteria for including the video in the video history display. The selection criteria can include one or more of following:

- The video has not been played in its entirety, and playback time is greater than some minimum threshold value, such as 10 seconds. This criteria is useful to filter out videos which the user did not watch the video for a sufficient amount of time to indicate a minimum level of interest in the video. Thus, in the example video history table of Table 1, the first two entries would be included, but the third one, for vid_Y, would not be because it was only played for 8 seconds. The last entry would be included because it has been played in its entirety, as indicated by a playback time of 00:00:00.
- the size (height and width) at which the video was displayed. This criteria is useful to filter out videos that displayed at size typically used to display video advertisements (e.g., 300×250, 336×280, 250×250, 200×200, 160×600, 120×600, 300×100, 468×60, 728×90, 300×60). This information can be read from the DOM element for the video, or alternatively, the video history table can be extended to this include this information.
- whether the parent window of the video is the main window or in a child or secondary window. In some cases, when a user loads a web page, that page is programmed to automatically open a secondary or child window and a play an advertisement in that secondary window. In that case, the video may play for longer than the minimum duration and at a different size than typically used for advertisement videos, but is still one that the user did not watch and would prefer to not include in the video history display. Accordingly, the history module 117 excludes videos that played in a secondary or child video from the video history display, rather than the main window. Again, this information can be read from the DOM element for the video, or alternatively, the video history table can be extended to this include this information.

If a video meets all (or a minimum number) of these selection criteria then the history module 117 inserts 608 the video into a display list of items to be included in the video history display, including the URL for source of the video, the title of the video, the representative image for the video, and the starting time for the video. The starting time can be the time at which the video was paused or left the video page 108, the time associated with the representative image, or another time. For example, if the user watched the entire video to the end, then the start time can be reset to the beginning of the video. The starting time can be encoded into the URL or other control function so that playback can be started directly from there.

Once all of items in the video history table are processed 610, the history module 117 forms 611 a representation of each video from the representative image associated with the video, and then renders 612 the history display in the manner described above with respect to FIG. 4 or FIG. 5, using the representations of the videos, and excluding representations of web pages that did not include an embedded video.

Figure 7:
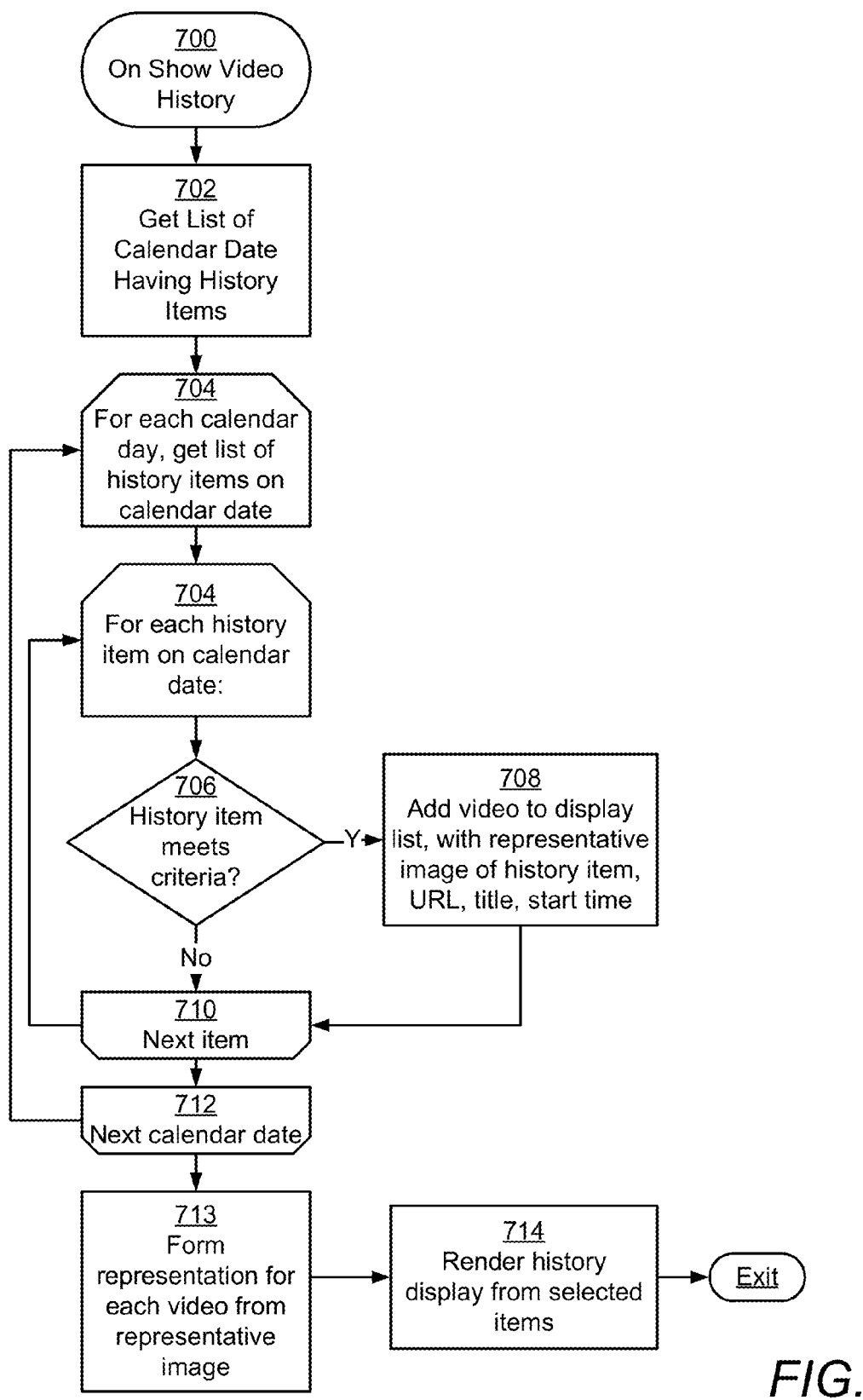
FIG. 7 is a flow diagram of another embodiment of a method in a browser for generating a video history display.

Referring now to FIG. 7, there is illustrated a flow diagram of the operation of the history module 117 for constructing the video history display, based on a WebKit implementation with an extended web history item class, according to one embodiment; as can be appreciated numerous of implementations can be devised as well using other browser development platforms.

As before, the flow is initiated 700 upon the user activating a show video history function, such as by a keyboard input or menu item selection. The history module 117 accesses the web history database 121 to get 702 a list of calendar dates for which the database 121 has history items. Starting from the most recent date, and proceeding through the list of calendar dates in reverse chronological order, for each listed calendar date, the history module 117 gets 704 the list of history items that were last visited on that calendar date. Next, for each item in the list of history item for the calendar date, the history module 117 determines 706 whether the history item for the video meets one or more selection criteria for including the video in the video history display. If a history item for a video meets all (or a minimum number) of the selection criteria, such as those set forth above, then the history module 117 inserts 708 the video into a display list of items to be included in the video history display, including the URL for source of the video, the title of the video, the representative image for the video, and the starting time for the video. Once all of items for a given calendar date are processed 710, the history module 117 iterates 712 to the next calendar date. Once all calendar dates are processed, the history module 117 forms 713 a representation of each video from the representative image associated with the video, and then renders 714 the history display in the manner described above with respect to FIG. 4 or FIG. 5, and excluding representations of web pages that did not include an embedded video.

Figure 8:
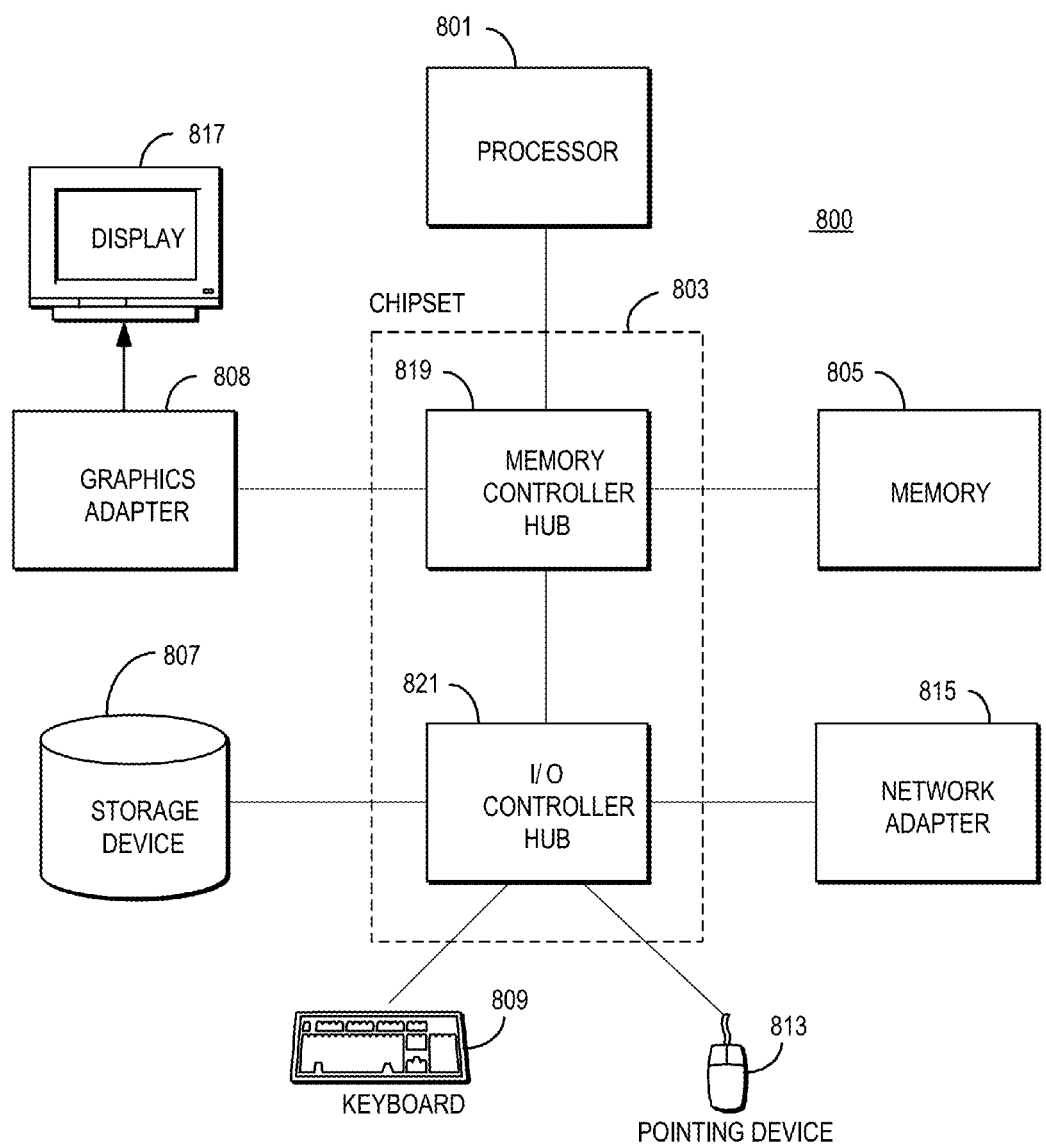
FIG. 8 is a high-level hardware block diagram of a computing device according to one embodiment.

FIG. 8 is a high-level hardware block diagram of a computing device 800 according to one embodiment, comprising at least one processor 801 coupled to a chipset 803. Also coupled to the chipset 803 are a memory 805, a storage device 807, a keyboard 809, a graphics adapter 811, a pointing device 813, and a network adapter 815. A display 817 is coupled to the graphics adapter 811. In one embodiment, the functionality of the chipset 803 is provided by a memory controller hub 819 and an I/O controller hub 821. In another embodiment, the memory 805 is coupled directly to the processor 801 instead of the chipset 803. The storage device 807 is any non-transitory computer-readable storage medium, such as a hard drive, compact disk read-only memory (CD-ROM), DVD, or a solid-state memory device. The memory 805 holds instructions and data used by the processor 801. The pointing device 813 may be a mouse, track ball, touch pad, or other type of pointing device, and is used in combination with the keyboard 809 to input data into the computer system 800. The graphics adapter 811 displays images and other information on the display 817. The network adapter 815 couples the computer system 800 to a local or wide area network. As is known in the art, a computing device 800 can have different and/or other components than those shown in FIG. 8. In addition, the computing device 800 can lack certain illustrated components. As is known in the art, the computing device 800 is adapted to execute computer program modules for providing functionality previously described herein. In one embodiment, program modules are stored on the storage device 807, loaded into the memory 805, and executed by the processor 801.

References in the specification to "one embodiment," "an embodiment," or "some embodiments," are equivalent and interchangeable and mean that a particular feature, structure, or characteristic described in connection with the embodiments is included in at least one embodiment, and may occur in combination with features, structures, or characteristics described in any other embodiment, and thus do not describe features that occur exclusively in only a single embodiment.

The appearances of the phrase "in one embodiment" in various places in the specification are not necessarily all referring to the same embodiment.

In this description, the term "module" refers to computational logic for providing the specified functionality. A module can be implemented in hardware, firmware, and/or software. It will be understood that the named modules described herein represent one embodiment, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the modules can be implemented as classes, packages, procedures, program units, functions, subroutines, object code, scripts, as well as a plurality of separate programs, or as one or more statically or dynamically linked libraries. In any of these software implementations, the modules are stored on the computer readable persistent storage mediums of a system, loaded into memory, and executed by the one or more processors of a computing device, such as computing device 101.

The operations herein may also be performed by an apparatus. This apparatus may be specially constructed for the required purposes, such as a computer particularly configured by a computer program stored in the computer, for example the above described browser application. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various types of computers may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

As used in this specification and the appended claims, the singular forms "a," "an," and "the" include plural referents unless the context clearly dictates otherwise. Where there are reference numbers including subscripts, such as "100(*a*)," "100(*b*)", "100(*c*)," etc. are used to identify elements or parts, use of a reference number without subscripts, such as "100" is understood to refer to the referenced type of element or part generally, whereas use of a reference number with subscript is understood to refer to a particular instance of an element or a part. Thus, a reference to "an element" includes both a single element as well as plurality of elements; reference to "element 10" is a general reference to all individual element 10(*a*), element 10(*b*), element 10(*c*), and so forth.

Finally, it should be noted that the language used in the specification has been principally selected for readability and instructional purposes, and may not have been selected to delineate or circumscribe the inventive subject matter. Thus words and phrases such as "with," "by", "using," "via," and the like are used synonymously herein, and no special difference is to be understood by selecting of one such term rather than another. Further, the use of the words or phrases "may," "can", "alternatively," are used to mean optional features that can be used as integers or elements of in combination with any other embodiment, element, function, structure or feature described herein. Accordingly, the disclosure of the present invention is intended to be illustrative, but not limiting, of the scope of the invention, which is set forth in the following claims.

What is claimed is:

1. A computer implemented method of generating in a browser a video history display, the method comprising:
at a device with one or more processors, non-transitory memory, one or more input devices, and a display:
displaying, on the display, in the browser a first plurality of web pages without embedded videos;
displaying, on the display, in the browser a second plurality of web pages with embedded videos, and playing back the embedded videos in the browser;
storing, in the non-transitory memory, history information for the embedded videos, the history information for a respective one of the embedded videos including a network location associated with a corresponding web page among the second plurality of web pages in which the respective video was embedded, and a network source location for accessing the respective video;
selecting two or more videos among the embedded videos that were played back in the browser for including in the video history display, wherein a first video among the two or more selected videos corresponds to a first web site among the second plurality of web pages and a second video among the two or more selected videos corresponds to a second web site among the second plurality of web pages; and
in response to receiving a user input, on the one or more input devices, displaying, on the display, in the browser the video history display, the video history display including representations for the two or more selected videos, and excluding representations of the first plurality of web pages without embedded videos.

2. The method of claim 1, further comprising:
storing with the history information for the embedded videos, a representative image derived from a selected frame in a portion of the video embedded videos that has been displayed; and
forming representations for the embedded videos from the representative images for the embedded videos, where the representations excludes non-video content from the web pages that included the embedded videos.

3. The method of claim 2, wherein storing with the history information for the embedded videos, a representative image derived from a selected frame in a portion of the video embedded videos that has been displayed further comprises:
responsive to one of the embedded videos being played back in its entirety, selecting the frame from a first five seconds of the one of the embedded videos that has been displayed in the browser; and
responsive to one of the embedded videos being played back in less than its entirety, selecting the frame from a last five seconds of the one of the embedded videos that has been displayed in the browser.

4. The method of claim 2, wherein storing with the history information for the embedded videos, a representative image derived from a selected frame in a portion of the video embedded videos that has been displayed further comprises:
periodically capturing frames of the embedded videos that have been played back in the browser;
determining that play back of one of the embedded videos in the browser has stopped; and
determining whether a last captured frame of the one of the embedded videos satisfies at least one image selection criteria based on image content features of the last captured frame; and
responsive to the last captured frame satisfying the at least one selection criteria, deriving the representative image for the one of the embedded videos from the last captured frame of the one of the embedded videos.

5. The method of claim 1, wherein storing history information for the embedded videos further comprises:
determining a title for the embedded videos, wherein the title of the embedded videos is different from a title of the web pages in which the embedded videos were embedded; and
storing the title in association with the history information for the embedded videos.

6. The method of claim 1, wherein displaying in the browser the video history display further comprises:
displaying the title of the two or more selected videos proximate to the representations of the two or more selected videos in the video history display.

7. The method of claim 1, wherein selecting two or more videos among the embedded videos that were played back in the browser for including in the video history display further comprises:
determining a play back time for a respective video among the embedded videos that were played back in the browser; and
selecting the respective video for including in the video history display if the play back time of the respective video exceeds a threshold amount.

8. The method of claim 1, wherein selecting two or more videos among the embedded videos that were played back in the browser for including in the video history display further comprises:
determining a size of a respective video among the embedded videos that were played back in the browser; and
selecting the respective video for including in the video history display if the size of the respective video is not associated with a size used to play back advertisement videos.

9. The method of claim 1, wherein selecting two or more videos among the embedded videos that were played back in the browser for including in the video history display further comprises:
determining a parent window for a respective video among the embedded videos that were played back in the browser; and selecting the respective video for including in the video history display if the parent window of the respective video is a main window of the browser.

10. The method of claim 1, further comprising:
receiving an input to start play back of a respective video among the two or more selected videos indicated by a respective representation in the video history display; and
responsive to the input, playing back the respective video in the video history display, without loading a separate page for playing back the respective video.

11. A computer implemented method of generating in a browser a video history display, the method comprising:
at a device with one or more processors, non-transitory memory, one or more input devices, and a display:
accessing a first plurality of web pages in the browser without embedded videos;
accessing a second plurality of web pages in the browser with embedded videos;
detecting play back by the browser of two or more embedded videos among the embedded videos, wherein a first video among the two or more embedded videos corresponds to a first web site among the second plurality of web pages and a second video among the two or more embedded videos corresponds to a second web site among the second plurality of web pages;
storing, in the non-transitory memory, history information for the two or more embedded videos played back by the browser, the history information for a respective embedded video among the two or more embedded videos including a network location associated with a web page in which the respective embedded video was embedded, a network source location for accessing the respective embedded video, a title for the respective embedded video, and a representative image derived from a representative frame of the respective embedded video;
forming representations for the two or more embedded videos played back by the browser from the representative images for the two or more embedded videos, wherein the representations exclude non-video content from web pages among the second plurality of web pages that included the two or more embedded videos; and
in response to receiving a user input, on the one or more input devices, displaying, on the display, in the browser the video history display, the video history display including the representations for the two or more embedded videos played back by the browser, and excluding representations of the first plurality of web pages without embedded videos.

12. The method of claim 11, wherein the stored title of the respective embedded video is different from a title of the web page in which the respective embedded video was embedded.

13. The method of claim 11, further comprising:
storing for the two or more embedded videos that has been played back by the browser a play back time of the video in association with the history information for the two or more embedded videos;
receiving an input to start play back of one of the two or more embedded videos indicated by a representation in the video history display; and
starting play back of the one of the two or more embedded videos at or subsequent to the play back time of the one of the two or more embedded videos.

14. The method of claim 11, further comprising:
playing back the one of the two or more embedded videos in the video history display, without loading a separate page for playing back the one of the two or more embedded videos.

15. The method claim 11, wherein storing the representative image derived from the representative frame of the respective embedded video further comprises:
responsive to one of the two or more embedded videos being played back in its entirety, deriving the representative image from a frame in a first five seconds of the one of the two or more embedded videos; and
responsive to the one of the two or more embedded videos being played back in less than its entirety, deriving the representative image from a frame in a last five seconds of the one of the two or more embedded videos that has been played back in the browser.

16. The method of claim 11, wherein storing the representative image derived from the representative frame of the respective embedded video further comprises:
periodically capturing frames of the two or more embedded videos that have been played back by the browser;
determining that display of one of the two or more embedded videos played back by the browser has stopped;
selecting a captured frame of the one of the two or more embedded videos satisfies at least one selection criteria based on image content features; and
deriving the representative image for the one of the two or more embedded videos from the selected frame.

17. The method claim 11, wherein displaying in the browser the video history display further comprises:
determining a parent window for the two or more embedded videos that were played back by the browser;
determining a size of the two or more embedded videos that were played back by the browser; and
selecting at least one embedded video from among the two or more embedded videos for including in the video history display only if the parent window of the least one embedded video is a main window of the browser, and the size of the least one embedded video is not associated with a size used to display advertisement videos.

18. A computer system configured to generate a video history display in a browser, the system comprising:
one or more input devices;
a display;
a processor configured to execute program code;
a non-transitory memory, coupled to the processor for storing the browser, the browser comprising program code, which when executed by the processor, cause to computer system to:
display, on the display, in the browser a first plurality of web pages without embedded videos;
display, on the display, in the browser a second plurality of web pages with embedded videos, and play back the embedded videos in the browser;
store, in the non-transitory memory, history information for the embedded videos, the history information for a respective one of the embedded videos including a network location associated with a corresponding web page among the second plurality of web pages in which the respective video was embedded, and a network source location for accessing the respective video;
select two or more videos among the embedded videos that were played back in the browser for including in the video history display, wherein a first video among the two or more selected videos corresponds to a first web site among the second plurality of web pages and a second video among the two or more selected videos corresponds to a second web site among the second plurality of web pages; and
in response to receiving a user input, on the one or more input devices, display, on the display, in the browser the video history display, the video history display including representations for the two or more selected videos, and excluding representations of the first plurality of web pages without embedded videos.

19. The computer system of claim 18, wherein the program code further causes the computer system to:
store with the history information for the embedded videos, a representative image derived from a selected frame in a portion of the video embedded videos that has been displayed; and
form representations for the embedded videos from the representative images for the embedded videos, where the representations exclude non-video content from the web pages that included the embedded videos.

20. The computer system of claim 19, wherein storing with the history information for the embedded videos, a representative image derived from a selected frame in a portion of the video embedded videos that has been displayed further comprises:
responsive to one of the embedded videos being played back in its entirety, selecting the frame from a first five seconds of the one of the embedded videos that has been displayed in the browser; and
responsive to one of the embedded videos being played back in less than its entirety, selecting the frame from a last five seconds of the one of the embedded videos that has been displayed in the browser.

21. The computer system of claim 19, wherein storing with the history information for the embedded videos, a representative image derived from a selected frame in a portion of the video embedded videos that has been displayed further comprises:
periodically capturing frames of the embedded videos that have been played back in the browser;
determining that play back of one of the embedded videos in the browser has stopped; and
determining whether a last captured frame of the one of the embedded videos satisfies at least one image selection criteria based on image content features of the last captured frame; and
responsive to the last captured frame satisfying the at least one selection criteria, deriving the representative image for the one of the embedded videos from the last captured frame of the one of the embedded videos.

22. The computer system of claim 18, wherein storing history information for the embedded videos further comprises:
determining a title for the embedded videos, wherein the title of the embedded videos is different from a title of the web pages in which the embedded videos were embedded; and
storing the title in association with the history information for the embedded videos.

23. The computer system of claim 18, wherein displaying in the browser the video history display further comprises:
displaying the title of the two or more selected videos proximate to the representations of the two or more selected videos in the video history display.

24. The computer system of claim 18, wherein selecting two or more videos among the embedded videos that were played back in the browser for including in the video history display further comprises:
  determining a play back time for a respective video among the embedded videos that were played back in the browser; and
  selecting the respective video for including in the video history display if the play back time of the respective video exceeds a threshold amount.

25. The computer system of claim 18, wherein selecting two or more videos among the embedded videos that were played back in the browser for including in the video history display further comprises:
  determining a size of a respective video among the embedded videos that were played back in the browser; and
  selecting the respective video for including in the video history display if the size of the respective video is not associated with a size used to play back advertisement videos.

26. The computer system of claim 18, wherein selecting two or more videos among the embedded videos that were played back in the browser for including in the video history display further comprises:
  determining a parent window for a respective video among the embedded videos that that were played back in the browser; and
  selecting the respective video for including in the video history display if the parent window of the respective video is a main window of the browser.

27. The computer system of claim 18, wherein the program code further causes the computer system to:
  receive an input to start play back of a respective video among the two or more selected videos indicated by a respective representation in the video history display; and
  responsive to the input, play back the respective video in the video history display, without loading a separate page for playing back the respective video.

28. A non-transitory computer readable storage medium storing one or more programs, the one or more programs comprising instructions, which when executed by an electronic device with a display and one or more input devices, cause the electronic device to:
  display, on the display, in the browser a first plurality of web pages without embedded videos;
  display, on the display, in the browser a second plurality of web pages with embedded videos, and play back the embedded videos in the browser;
  store, in the non-transitory computer readable storage medium, history information for the embedded videos, the history information for a respective one of the embedded videos including a network location associated with a corresponding web page among the second plurality of web pages in which the respective video was embedded, and a network source location for accessing the respective video;
  select two or more videos among the embedded videos that were played back in the browser for including in the video history display, wherein a first video among the two or more selected videos corresponds to a first web site among the second plurality of web pages and a second video among the two or more selected videos corresponds to a second web site among the second plurality of web pages; and
  in response to receiving a user input, on the one or more input devices, display, on the display, in the browser the video history display, the video history display including representations for the two or more selected videos, and excluding representations of the first plurality of web pages without embedded videos.

29. The non-transitory computer readable storage medium of claim 28, wherein the instructions further cause the electronic device to:
  store with the history information for the embedded videos, a representative image derived from a selected frame in a portion of the video embedded videos that has been displayed; and
  form representations for the embedded videos from the representative images for the embedded videos, where the representations exclude non-video content from the web pages that included the embedded videos.

30. The non-transitory computer readable storage medium of claim 29, wherein storing with the history information for the embedded videos, a representative image derived from a selected frame in a portion of the video embedded videos that has been displayed further comprises:
  responsive to one of the embedded videos being played back in its entirety, selecting the frame from a first five seconds of the one of the embedded videos that has been displayed in the browser; and
  responsive to one of the embedded videos being played back in less than its entirety, selecting the frame from a last five seconds of the one of the embedded videos that has been displayed in the browser.

31. The non-transitory computer readable storage medium of claim 29, wherein storing with the history information for the embedded videos, a representative image derived from a selected frame in a portion of the video embedded videos that has been displayed further comprises:
  periodically capturing frames of the embedded videos that have been played back in the browser;
  determining that play back of one of the embedded videos in the browser has stopped; and
  determining whether a last captured frame of the one of the embedded videos satisfies at least one image selection criteria based on image content features of the last captured frame; and
  responsive to the last captured frame satisfying the at least one selection criteria, deriving the representative image for the one of the embedded videos from the last captured frame of the one of the embedded videos.

32. The non-transitory computer readable storage medium of claim 28, wherein storing history information for the embedded videos further comprises:
  determining a title for the embedded videos, wherein the title of the embedded videos is different from a title of the web pages in which the embedded videos were embedded; and
  storing the title in association with the history information for the embedded videos.

33. The non-transitory computer readable storage medium of claim 28, wherein displaying in the browser the video history display further comprises:
  displaying the title of the two or more selected videos proximate to the representations of the two or more selected videos in the video history display.

34. The non-transitory computer readable storage medium of claim 28, wherein selecting two or more videos among the embedded videos that were played back in the browser for including in the video history display further comprises:

determining a play back time for a respective video among the embedded videos that were played back in the browser; and selecting the respective video for including in the video history display if the play back time of the respective video exceeds a threshold amount.

35. The non-transitory computer readable storage medium of claim 28, wherein selecting two or more videos among the embedded videos that were played back in the browser for including in the video history display further comprises:

determining a size of a respective video among the embedded videos that were played back in the browser; and selecting the respective video for including in the video history display if the size of the respective video is not associated with a size used to play back advertisement videos.

36. The non-transitory computer readable storage medium of claim 28, wherein selecting two or more videos among the embedded videos that were played back in the browser for including in the video history display further comprises:

determining a parent window for a respective video among the embedded videos that that were played back in the browser; and selecting the respective video for including in the video history display if the parent window of the respective video is a main window of the browser.

37. The non-transitory computer readable storage medium of claim 28, wherein the instructions further cause the electronic device to:

receive an input to start play back of a respective video among the two or more selected videos indicated by a respective representation in the video history display; and responsive to the input, play back the respective video in the video history display, without loading a separate page for playing back the respective video.

38. A non-transitory computer readable storage medium storing one or more programs, the one or more programs comprising instructions, which when executed by an electronic device with a display and one or more input devices, cause the electronic device to:

access a first plurality of web pages in the browser without embedded videos access a second plurality of web pages in the browser with embedded videos;

detect play back by the browser of two or more embedded videos among the embedded videos, wherein a first video among the two or more embedded videos corresponds to a first web site among the second plurality of web pages and a second video among the two or more embedded videos corresponds to a second web site among the second plurality of web pages;

store, in the non-transitory computer readable storage medium, history information for the two or more embedded videos played back by the browser, the history information for a respective embedded video among the two or more embedded videos including a network location associated with a web page in which the respective embedded video was embedded, a network source location for accessing the respective embedded video, a title for the respective embedded video, and a representative image derived from a representative frame of the respective embedded video;

form representations for the two or more embedded videos played back by the browser from the representative images for the two or more embedded videos, wherein the representations exclude non-video content from web pages among the second plurality of web pages that included the two or more embedded videos; and in response to receiving a user input, on the one or more input devices, display, on the display, in the browser the video history display, the video history display including the representations for the two or more embedded videos played back by the browser, and excluding representations of the first plurality of web pages without embedded videos.

39. A computer system configured to generate a video history display in a browser, the system comprising:

one or more input devices;

a display;

a processor configured to execute program code;

a non-transitory memory, coupled to the processor for storing the browser, the browser comprising program code, which when executed by the processor, cause to computer system to:

access a first plurality of web pages in the browser without embedded videos;

access a second plurality of web pages in the browser with embedded videos;

detect play back by the browser of two or more embedded videos among the embedded videos, wherein a first video among the two or more embedded videos corresponds to a first web site among the second plurality of web pages and a second video among the two or more embedded videos corresponds to a second web site among the second plurality of web pages;

store, in the non-transitory memory, history information for the two or more embedded videos played back by the browser, the history information for a respective embedded video among the two or more embedded videos including a network location associated with a web page in which the respective embedded video was embedded, a network source location for accessing the respective embedded video, a title for the respective embedded video, and a representative image derived from a representative frame of the respective embedded video;

form representations for the two or more embedded videos played back by the browser from the representative images for the two or more embedded videos, wherein the representations exclude non-video content from web pages among the second plurality of web pages that included the two or more embedded videos; and in response to receiving a user input, on the one or more input devices, display, on the display, in the browser the video history display, the video history display including the representations for the two or more embedded videos played back by the browser, and excluding representations of the first plurality of web pages without embedded videos.

* * * * *